March 11, 1969   P. M. SCHROEDER, JR   3,432,125
STOWABLE AFT FAIRING FOR A REUSABLE ROCKET
Filed July 18, 1966

INVENTOR.
PAUL M. SCHROEDER JR.
BY
AGENT

United States Patent Office  3,432,125
Patented Mar. 11, 1969

3,432,125
STOWABLE AFT FAIRING FOR A REUSABLE ROCKET
Paul M. Schroeder, Jr., San Diego, Calif., assignor to General Dynamics Corporation, San Diego, Calif., a corporation of Delaware
Filed July 18, 1966, Ser. No. 565,788
U.S. Cl. 244—130
Int. Cl. B64c 1/38; B64d 33/04; B64g 1/00
5 Claims

ABSTRACT OF THE DISCLOSURE

A foldable fairing device mounted on the aft blunt base of a pilot-controlled rocket. The fairing is preferably formed in upper and lower sections, each having a plurality of preloaded U-shaped hoops for tensioning a foldable cover attached to the hoops and to the rocket housing. The end portions of each hoop are pivotally journalled on the rocket housing adjacent the blunt end thereof. During pilot controlled flight, the hoops and cover are rotatably extended in clamshell fashion to effect an aerodynamic fairing aft of the blunt rocket base. In rocket powered flight, the hoops and cover are retracted into a recess within the structure of the blunt base. Extension and retraction is by power actuator geared to an end of the aftmost hoops of each fairing section.

---

This invention relates to an arrangement for tapering the blunt base of a vehicle adapted to travel in a fluid medium but more particularly to an unfolding fairing device for reducing the aerodynamic base drag of rockets during subsonic flight. In the missile and rocket industry, the use of aerodynamically designed nose cones and streamlined shaped body constructions is well known.

The base portion contains the thrust engines so that base drag occurs only when the engines are shut off. At that shut-off time, the rocket or stage has fulfilled its obligations and is of no more concern and is disposed of.

For example, an Atlas rocket carrying a nose cone satellite package to be put into orbit is to be launched and at a certain predetermined altitude, the Atlas booster has done its part of the satellite launching operation. The nose cone travels further towards its required orbit but the Atlas booster, now separated from its payload, falls back and is eventually destroyed at re-entry towards earth.

It has been determined by space scientists that a booster rocket could be reclaimed and used again several times. However, several changes should be incorporated in the rocket booster so that a safe, undamaged return could be obtained, which changes would convert the rocket, after its launching use, into a flying vehicle. Similar aircraft characteristics and problems would be experienced by a converted rocket or a so-called "recoverable rocket booster" such as, for example, lift and drag.

Therefore, the new concept disclosed in the present invention relates to reusable rocket vehicles which at subsonic cruise-back flight develop an aerodynamic drag at their base structures and wherein a mechanism is proposed for preventing this base drag. The base structure encloses the launching power plant which is not used for re-entry and return flight. Considering now the base drag that is involved at the base portion, two fundamental changes have to be made to the herebefore mentioned rocket design. The first is the tapering or boat-tailing of the rocket body from the thrust structure to the lower end of the main rocket engine or engines. The second is to provide a closing fairing that stows around the edge of the lower body and then extends to complete the taper of the body and provide a low drag profile.

The present arrangement or device consists of a U-shaped cross-section ring at the body base opening aft area including two pivot points with drive means, such as actuators, motors or the like. Within the U-ring are stored a series of hoops of a material resistant to high temperature, such as stainless steel, each pre-loaded to deploy into a specific shape as predetermined by vehicle tapering lines. The hoops are attached only at the pivot points. Furthermore, the hoops are supporting a woven metal fabric such as Rene, properly sealed to eliminate air leakage, and contoured to form a fairing skin when the hoops are rotated to the extended or unfolding position.

Accordingly, it is an object of the present invention to provide a novel aerodynamic drag reducing structure which is dependable, light-weight and possesses the necessary rigidity.

It is another object of the present invention to provide a drag reducing device which is unfolded during return flight of the booster vehicle thereby reducing aerodynamic drag resulting in fuel saving and flight control stability of the vehicle.

It is another object of the present invention to provide an improved and novel unfolding drag reducing apparatus having preloaded structural means for deploying into a predetermined configuration in coordination with vehicle design contours.

Other objects, features and advantages of the present invention will become apparent from the following description taken in conjunction with the accompanying drawings, in which.

Figure 1:
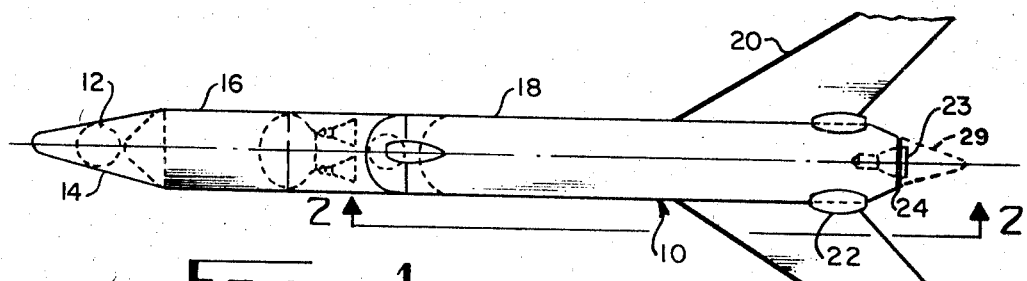
FIGURE 1 shows a plan view of a multi-stage rocket, employing an Atlas booster, Centaur second stage and nose cone with payload arrangement.

In general the present invention comprises a housing defining an opening at the base structure of a vehicle. Pivot means located at the base structure and connected to drive means. Stiffener means being a plurality of preloaded members pivotally mounted at the pivot means. Retaining means for holding the stiffener means in folded position at the base structure opening periphery. Fabric means attached at the retaining means and attached at spaced intervals to the stiffener means and drive means connected to the pivot means for unfolding the stiffener means with the fabric means into a predetermined positioned support structure for closing off the base structure opening.

In order to provide a more detailed and specific operation of the invention the drawings are provided with reference characters designating the various parts and their function throughout the several views.

Referring to FIGURE 1, there is shown a diagrammatic plan view of a multi-stage rocket 10 having a payload 12 mounted on its nose cone portion 14. A second stage booster 16 is operably mounted on top of a first booster 18 which is a recoverable booster provided with a pair of wing structures 20.

Figure 2:
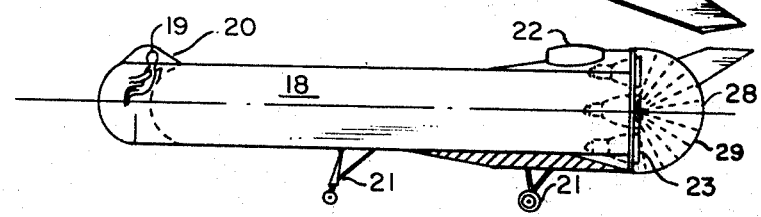
FIGURE 2 shows a plan view of the Atlas booster, taken from FIGURE 1 along line 2—2 and illustrating the Atlas booster in return flight or cruise-back configuration.

In FIGURE 2, there is illustrated a side view of the booster rocket 18 taken along line 2—2 of FIGURE 1.

In FIGURE 2 the booster rocket 18 is shown in its cruise-back landing position. The preferred embodiment of the present invention comprises, for instance, a recoverable Atlas booster 18 which is piloted manually by a pilot 19 positioned in the front portion of the Atlas booster. An unfolded cockpit structure 20 is provided in the front portion and the pilot 19 is positioned in a similar manner as in aircraft so that an unlimited view is obtained for flyback and landing through the transparent unfolded cockpit structure 20 as shown in FIGURE 2. Landing gears 21 are unfolded from the booster vehicle 18. Two fan-jet engines 22 are mounted on top of the booster vehicle 18 for providing the flyback thrust power. The three main thrust launching engines 23 mounted at the base thrust area 24 of the booster 18 have been turned off prior to separation from the second stage 16.

During the flyback of the rocket booster 18, the stowable segmented fairing 28 at the aft portion 24 is unfolded to a protruding laterally extending fairing position. The stowed segmented fairing means deploys into an aerodynamic drag reduction structure 29 as shown in more detail in FIGURE 3.

Assuming now that the booster recoverable rocket 18 is separated from the second stage, manual control of the rocket is taken over by the pilot 19 for return flight.

The cockpit 20 unfolds and engines 22 are ignited. The base drag reduction device 29 is unfolded so that drag is reduced at the aft structure and better maneuverability and control of the vehicle can be obtained.

Figure 3:
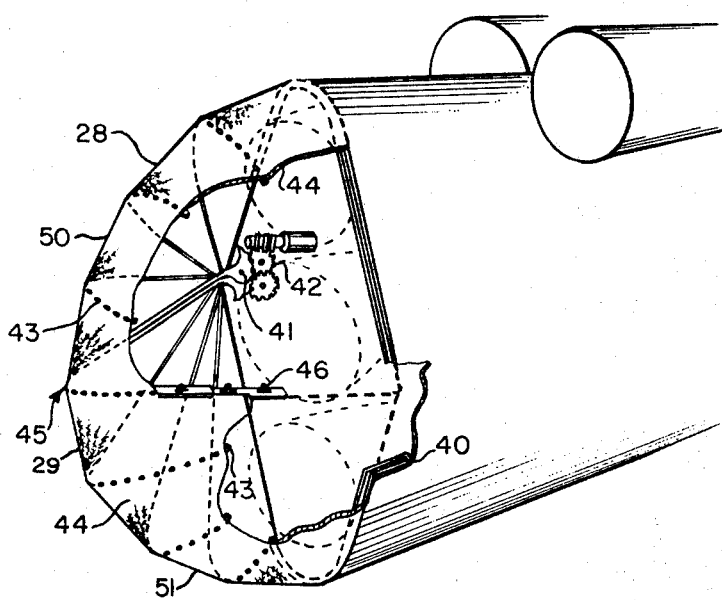
FIGURE 3 shows the structure for preventing aerodynamic drag at the base of the Atlas booster in its full unfolded position and wherein a broken away section illustrates a more detailed view of the drive and pivot means installed at the inner rocket sidewall.

The base drag reduction device 29 consists of a ring or of U-shaped cross-section mounted at the periphery of the base opening structure of the recoverable rocket booster 18. Two pivot points or means 41 are positioned at the base structure and connected thereto in a drive means 42 or gear means and motor 42 as shown in FIGURE 3.

A plurality of preloaded stiffener means or hoops 43 are retained in the U-shaped ring 40. A foldable material or metal fabric 44 is attached to the hoops 43 at spaced intervals and at the periphery of the base opening of the aft portion 24.

During unfolding of the base drag reduction device 29, the first hoops 45 will leave the U-shaped member 40 and snap into the required contour configuration. Unfolding is achieved by the activation of the motor means 42 which will progressively release the hoops from the U-shaped ring or member 40. Latching means 46 are provided at the first pair of hoops 45 which will close off the drag reduction device 29 when in its fully deployed position.

The hoops may, upon actuation of the fairing 29, be repositioned progressively from the upper and lower sections 50 and 51 by the provision of rotary detents (not shown) at the pivot means.

The progressive extension of the segments of the upper and lower sections 50 and 51 will cause the locking in place of the first hoops 45 by latching means 46 or the like.

The extendable fairing is capable of reacting to subsonic aerodynamic pressure by transmission of the fabric pressures to the hoops and thence to the pivot points.

The metal fabric 44 and hoops 43 are reusable and restowed into the ring or member 40, prior to the next firing of the booster rocket 18.

It will be understood, of course, that the preferred embodiment which is shown herein and comprises a pair of unfolding assemblies pivotally mounted at each side of half of the periphery of the base opening could be replaced by one assembly of hoops which in unfolded condition is stowed against half of the periphery of the rounded opening and during unfolding rotates and positions itself in a complete half circular concave shaped closure attaching itself by latching means to the other half periphery of said rounded opening.

It will be understood also that the concave half circular base drag reduction device as is shown in the preferred embodiment as illustrated herein, could be provided with predetermined and preloaded hoops which would provide a fairing having a certain predetermined shape having specific flat, indented or sharp contoured designed configurations.

I claim:
1. A base drag reduction device for a vehicle adapted to travel through a fluid medium comprising in combination:
    (a) a housing defining an opening therein at the base structure of said vehicle,
    (b) said housing having a first side and a second side adjacent said opening,
    (c) a first and second pivot means located on said first side and said second side respectively of said housing,
    (d) stiffener means comprising a first group and second group of preloaded members,
    (e) said first and second groups of said preloaded members being pivotally mounted on said first and second pivot means,
    (f) retaining means for holding said stiffener means at said base structure opening periphery,
    (g) fabric means attached at said retaining means and attached at spaced intervals to said stiffener means, and
    (h) drive means connected to said pivot means for releasing said stiffener means from said retaining means into a predetermined streamlined support structure for closing off said base structure opening of said vehicle.

2. A base drag reduction device for a vehicle adapted to travel through a fluid medium comprising in combination:
    (a) a housing defining therein a generally rounded opening at the base structure of said vehicle,
    (b) a pair of pivot means mounted at said vehicle aft base structure, each said pivot means oppositely located of one another next to said rounded opening periphery,
    (c) means having U-shaped cross-section secured at said opening periphery and containing a plurality of hoops of preloaded material for assuming a predetermined shape and each said hoops connected with each end portion pivotally at one of said pivot means respectively,
    (d) drive means secured to said vehicle and connected with said pivot means for releasing said hoops retained in said means of U-shaped cross-section in a progressive lateral position, and
    (e) a foldable material connected to said means of U-shaped cross-section and each said plurality of hoops at spaced intervals whereby said drive means upon activation is adapted to rotate said hoops from its stowed position into an outwardly protruding position whereby each said hoops positions itself in a predetermined location by stretching said folded material into a smooth fairing surface completely closing said generally rounded opening at said base structure in a streamlined configuration.

3. A base drag reduction device as claimed in claim 2 wherein one of said plurality of preloaded hoops first released from said means of U-shaped cross-section is provided with latching means so that said base drag reduction device in unfolded position is rigidly closed and locked by said latching means.

4. A base drag reduction device as claimed in claim 2 wherein said foldable material comprises a flexible metal fabric.

5. A base drag reduction device for a vehicle adapted to travel through a fluid medium and having a housing defining at its base portion a generally rounded opening comprising in combination:
    (a) a pair of pivot means diametrically oppositely mounted from one another at said base structure rounded opening,
    (b) a plurality of hoops mounted pivotally at each end to each of said pivot means, (c) retaining means having U-shaped cross-section provided at said rounded opening periphery in which said hoops are retained in a stacked position,
(d) drive means secured to said vehicle and connected with said pivot means for releasing said hoops from said retaining means and rotating said hoops progressively to predetermined locations,
(e) said plurality of hoops being of a preloaded material for assuming a predetermined shape after release from said retaining means, and
(f) a foldable material of integrally connected segments secured to said outer periphery of said opening and secured at spaced intervals to each said plurality of hoops so that said foldable material contours itself into a smooth rigid fairing for said vehicle when said drive means upon activation rotates said hoops along said pivot means until a complete closure is established about said rounded opening.

References Cited

UNITED STATES PATENTS

| | | | |
|---|---|---|---|
| 1,071,348 | 8/1913 | Rice | 296—114 |
| 1,327,339 | 1/1920 | Logan | 244—121 |
| 1,937,520 | 12/1933 | Lightner | 244—30 |

MILTON BUCHLER, *Primary Examiner.*

J. E. PITTENGER, *Assistant Examiner.*